2 Sheets—Sheet 1.

J. BURGE.

Assignor to the Yale Lock Manufacturing Co.

TIME-LOCKS.

No. 7,858. Reissued Aug. 21, 1877.

*WITNESSES*

Wm A. Skinkle

E. K. Lone

*INVENTOR*

JOHN BURGE.

*By his Attorney* Marcus S. Hopkins

N. PETERS, PHOTO-LITHOGRAPHER, WASHINGTON, D. C.

2 Sheets—Sheet 2.

J. BURGE.

Assignor to the Yale Lock Manufacturing Co.

TIME-LOCKS.

No. 7,858. Reissued Aug. 21, 1877.

WITNESSES

Wm A. Skinkle

E. K. Lane

INVENTOR

JOHN BURGE.

By his Attorney Marcus S. Hopkins

N. PETERS, PHOTO-LITHOGRAPHER, WASHINGTON, D. C.

UNITED STATES PATENT OFFICE.

JOHN BURGE, OF CIRCLEVILLE, OHIO, ASSIGNOR TO THE YALE LOCK MANUFACTURING COMPANY, OF STAMFORD, CONNECTICUT.

IMPROVEMENT IN TIME-LOCKS.

Specification forming part of Letters Patent No. 166,255, dated August 3, 1875; Reissue No. 7,858, dated August 21, 1877; application filed March 17, 1876.

DIVISION D.

*To all whom it may concern:*

Be it known that I, JOHN BURGE, of Circleville, Pickaway county, Ohio, have invented certain new and useful Improvements in Chronometric Locks for Application to the Doors of Safes and Vaults, of which the following is a specification that will enable those skilled in the art to which they pertain to make and use the same, reference being had to the accompanying drawings, in which like letters indicate corresponding parts.

The object of my invention is to provide a time-lock which, if properly wound, will automatically unlock the fastenings of a safe or vault door, at given periods, six days of the seven.

To this end I employ two dials, each having six notches in its periphery, and each operated (for greater security) by an independent time mechanism driven by two independent mainsprings, either of which is adequate, in case of failure of the other, to revolve its dial. Upon the peripheries of these dials rests a yoke, which, as the dials revolve, drops successively into the notches of both dials (or one of them, as the case may be) at a predetermined time daily, except Sunday, and trips a lever, thus releasing the clock-work of a direct-acting unlocking mechanism, which releases the bolt or bolt-work of the door, and at the same time gives an alarm.

My invention consists in certain features and combinations of parts hereinafter particularly described, and specified in my claims.

Figure 1:
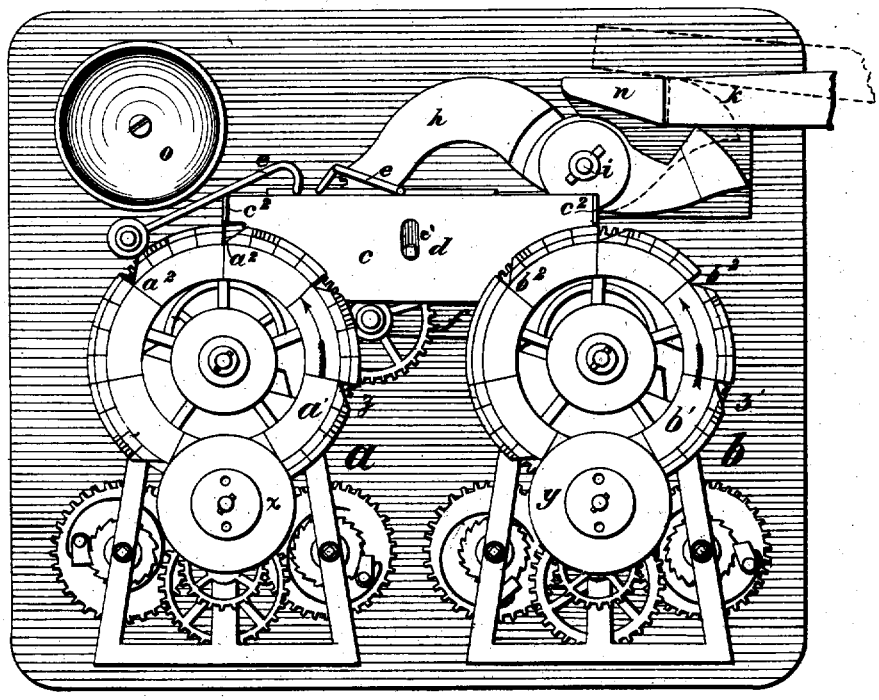
Figure 2:
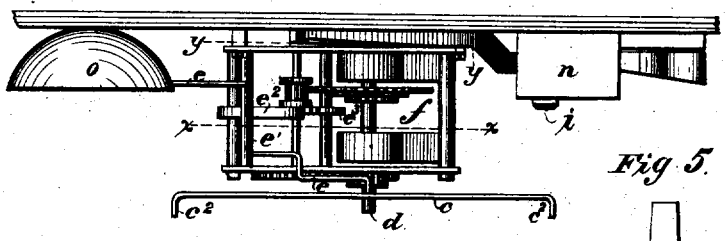
Figure 5:
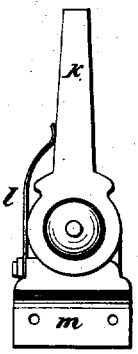
Figure 3:
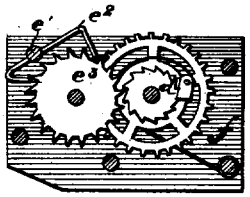
Figure 4:
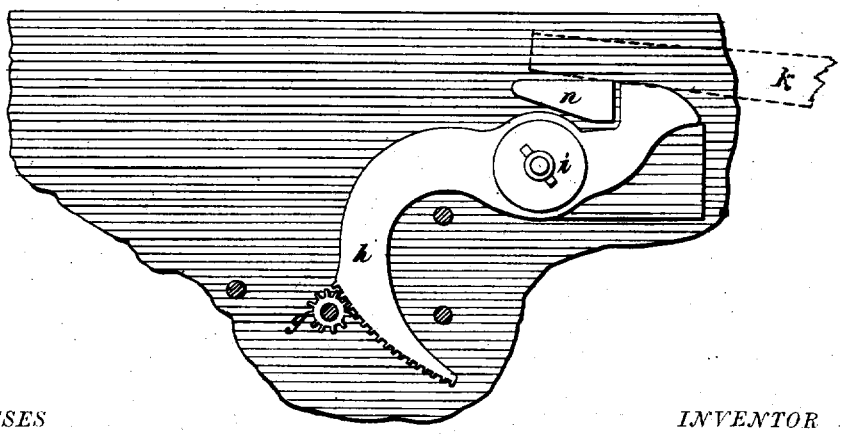

In the drawings, Figure 1 is a front view of my improved chronometric lock, showing also a section of the device I employ for connecting my lock with the ordinary bolt or bolt-work, as it has long been known in the art, of a safe or vault door. Fig. 2 is a top view of the same, showing my direct-acting unlocking and alarm mechanism. Fig. 3 is a view in section through the line *x x* of Fig. 2. Fig. 4 is a view of the pivotal unlocking device through the line *y y* of Fig. 2, showing it in position as having performed its unlocking function. Fig. 5 is a view of my connecting device or tongue-piece for connecting the time-lock with the ordinary bolt or bolt-work of a safe or vault door.

The letters *a* and *b* denote two clock-work mechanisms of similar construction, carrying each a dial, $a^1$ and $b^1$, respectively, so set and adjusted as to make one complete rotation once in seven days. Each dial, as here shown, has six notches, $a^2$ $b^2$, which are equidistant along its periphery, except two, that are separated from each other by twice the separating distance of the others. The notches, except the two mentioned, are a seventh of the circumference of each dial apart, answering to the six business days of the week. As the lock is not designed to open on Sunday, no notch is cut for that day; hence the wider separation of two of the notches.

Above and partly in rear of the two dials is the yoke or detent plate *c*, having a central vertical slot, $c^1$, through which projects the winding-post *d* of the direct-acting unlocking mechanism. The yoke has a limited vertical movement on this post, and is provided at its ends with tips $c^2$ $c^2$, which rest, respectively, on the peripheries of the dials. As the motion of the dials will be slow, the yoke will alternately remain in the notches a short period, and will be gradually raised on the inclined sides of the notches to the peripheries. In the latter position the yoke holds up the clapper-lever *e*, thereby preventing the running down of the direct-acting unlocking mechanism. But the adjustments are such that, when during the revolution of either or both dials, one or both of the tips $c^2$ fall into a notch or notches, the inner end of the clapper-lever *e* (pivoted on the shaft $e^1$, which carries the ratchet $e^2$) is let down, and releases the ratchet $e^2$ of a third double-spring clock-work, *f*, similar to a common alarm. This clock-work *f* revolves the pinion *g*, meshing into the cogged segment of the unlocking device of lever *h*, pivoted on the pin *i*. The revolution of the pinion *g*, by the automatic action of the clock-work *f*, raises the outer end of the turning-lever *h*, and with it the free end of the tongue-piece *k*, which is pressed down by the spring *l*, and is pivoted to the rigid piece *m*, which latter is designed to be secured on the string-bar of the ordinary bolt-work of a safe.

Supposing the bolt-work to have been thrown forward into the locked position, the tongue-piece *k* would normally fall behind and abut against the block *n*, and thus automatically lock and prevent the bolt-work from being retracted; but when the tongue-piece *k* has been raised, as described, by the action of the clock-work, the bolt or bolt-work can be thrown back into the unlocked position by the ordinary means, the connecting-piece *k* sliding over the top of the block *n*, as indicated in dotted lines in Fig. 4. The outer end of the clapper-lever *e* strikes on the bell *o* as the lever is vibrated with the ratchet by the running down of the clock-work *f*, thus giving notice that the connecting-piece *k* is raised so that the bolt-work can be thrown back and the door opened.

*x* and *y* are small disks or thumb-pieces secured to the shafts of the clock-works which carry the last pinions in the main trains of gearing, or those that immediately drive the large gear-wheels *z z'* under the notched dials. By means of these thumb-pieces the notched dials can be readily revolved and set in any desired position.

I am, of course, not obliged to use both the duplicate mainsprings for rotating the dials, although it is safer to do so. Nor am I limited to the use of dials which release the lock but once a day, for the notches may be cut to any desired intervals, and the speed of rotation of the dials regulated accordingly. The main clock-works need only be wound once a week; but the direct-acting unlocking mechanism must be wound after each unlocking, which winding will move the lever *h* on its pivotal fulcrum into the unlocked position, as shown in Fig. 1, to be at the proper time automatically moved back into the unlocked position, as shown in Fig. 4.

Previous to shutting the safe-door it is obvious that all the time mechanism must be set in the locked position, and that at the same time the great bolt or bolt-work of the safe-door must remain in the retracted position, so that the door can be closed. For that reason it is essential, in the use of all time-locks with which there is no communication from the outside of the safe-door, and in which there is not an automatic locking accomplished by the time mechanism itself, as shown in my patent of February 6, 1872, that some device be employed which will accommodate such conditions. Such is the purpose of my automatic tongue-piece *k*.

The operation of my device is as follows: The dials are to be adjusted so that, by their revolution in the direction indicated by the arrows, the first releasing of the fastening devices shall occur at such a time and by means of such a notch or notches as may be desired. All the clock-work is then to be wound, the safe-door closed, and the bolt or bolt-work thrown as usual from the outside, which will cause it to be automatically locked, as I have described, by the action of the tongue-piece *k*. At the end of each successive twenty-four hours during a week from the time of the first unlocking, except on Sunday, the other unlockings will occur, and warning will be given by the bell.

What I claim as of my own invention is—

1. The combination of the dials arranged to revolve once in seven days, and provided with devices for releasing the unlocking mechanism daily or otherwise, and the clock-work, substantially as described.

2. The combination, substantially as before set forth, of the two revolving dials and the connecting-yoke resting thereon.

3. The combination, substantially as described, of the direct-acting unlocking clock-work, two time-movements for determining the time of action of said clock-work, and the yoke and dials, substantially as described.

JOHN BURGE.

Witnesses:
B. H. BOSTWICK,
J. W. TIMMONS, Jr.